Patented Sept. 17, 1929

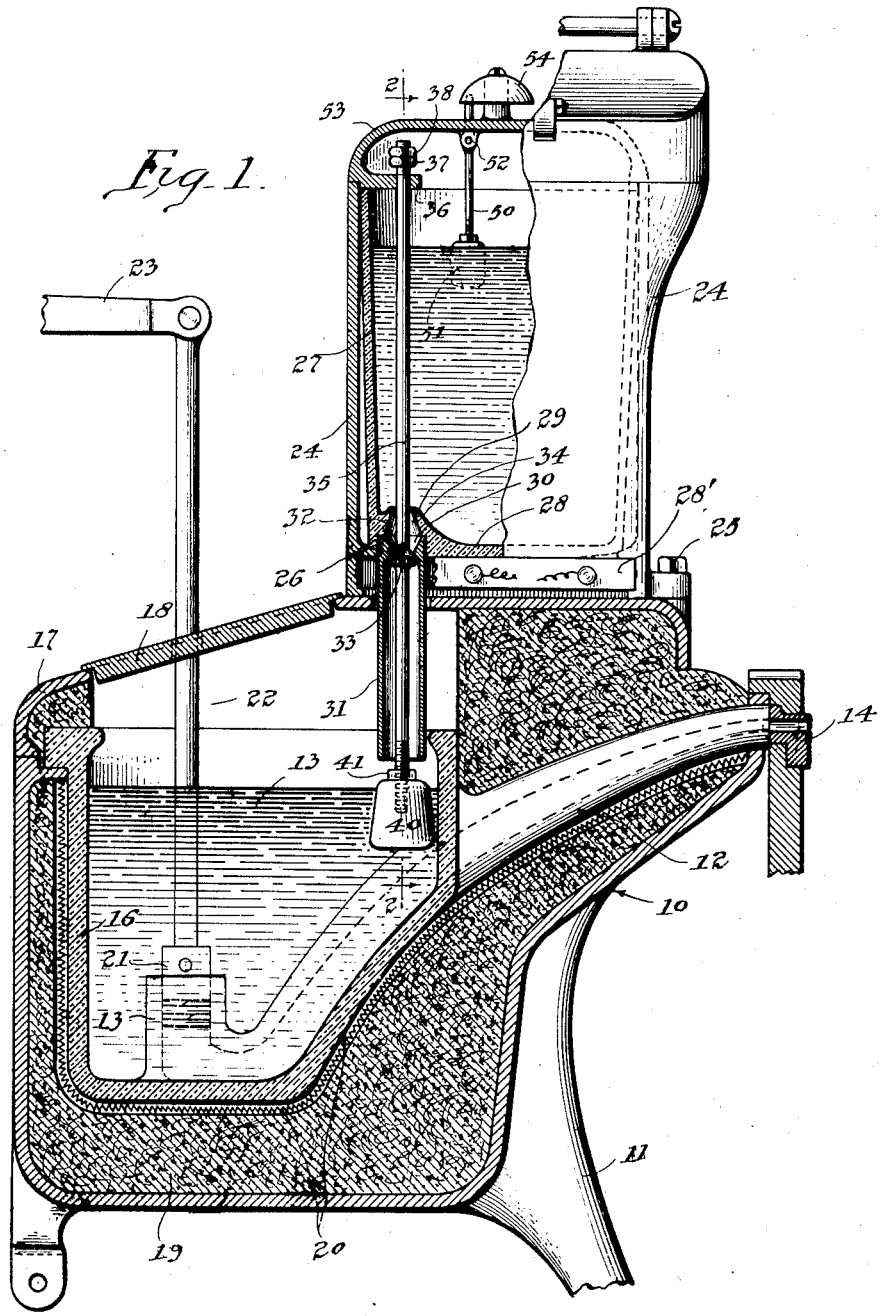

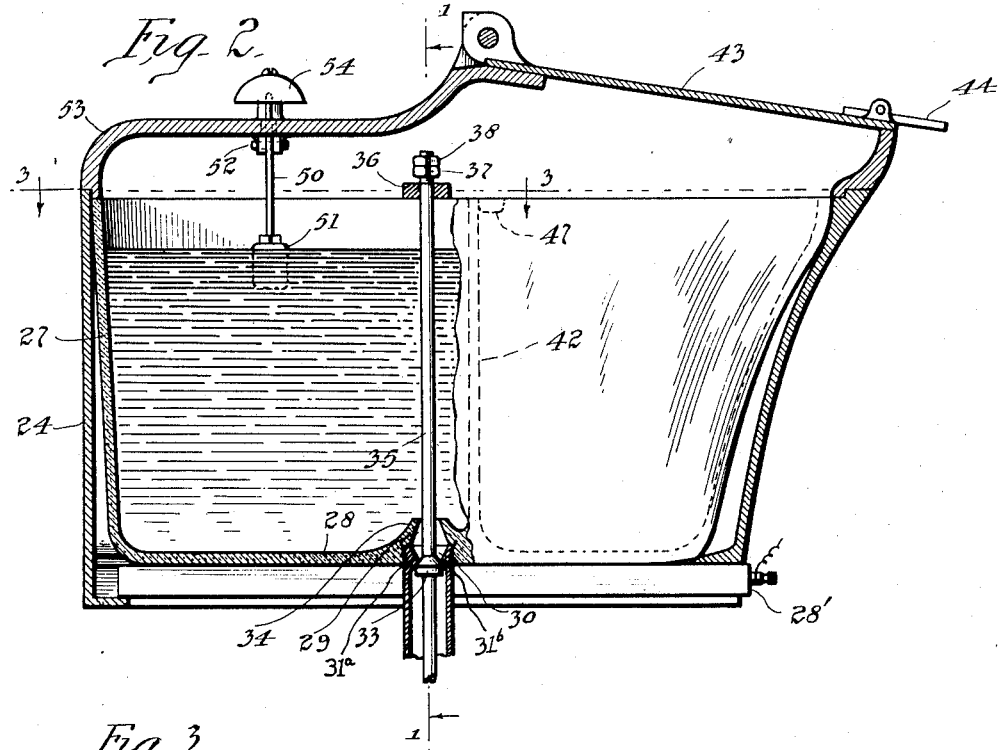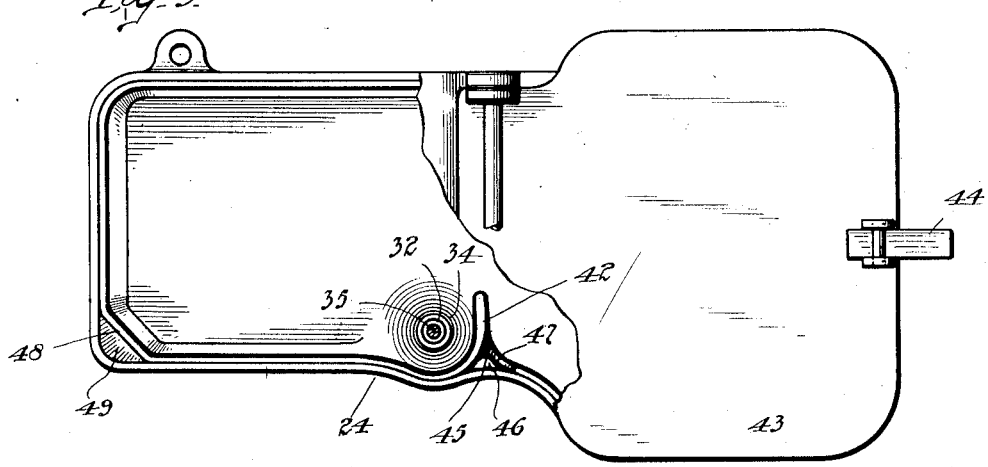

1,728,888

UNITED STATES PATENT OFFICE

FRED M. JOERNDT AND WILBUR A. JOERNDT, OF CHICAGO, ILLINOIS

AUXILIARY MELTING POT

Application filed December 21, 1927. Serial No. 241,532.

This invention relates to improvements in auxiliary melting pots or crucibles for linotype or like machines.

The principal object of the invention is to provide an improved crucible or auxiliary melting pot for the type metal that can be installed on a standard main pot of a linotype machine or the like without any substantial modification of the machine, and which is simple in construction, positive in operation, and which is not likely to get out of order.

A further object of the invention relates to the provision of an improved valve mechanism for controlling the delivery of molten metal from the crucible to the main pot.

An additional object is to provide a crucible so shaped that danger of breakage thereof, due to the uneven expansion of the metal in the crucible, is lessened, the crucible also being arranged to prevent the passage of dross into the discharge opening thereof.

Another object relates to the provision of an audible signalling device for indicating the lowering of the molten metal in the crucible below a predetermined level.

Other objects relate to various features of construction and arrangement of parts which will become apparent from a consideration of the following specification and accompanying drawings wherein:

Figure 1 is a side elevation, partly in section, illustrating the auxiliary pot or crucible, in position on a main pot.

Fig. 2 is a broken sectional view taken on the line 2—2 of Fig. 1.

Fig. 3 is a plan view of the improved crucible, parts being broken away for the purpose of clearness.

In the drawings 10 indicates generally the main pot casing of a standard linotype machine, the pot being provided with brackets 11 which are pivoted to a part of the linotype machine whereby the pot can be rocked to the position shown in Figure 1 wherein the outer end of the goose-neck 12 is in position to discharge a quantity of the molten metal 13 into the mold 14.

The goose-neck 12 terminates at its inner end in an open cylinder 15 formed integrally with the pot 16 which is supported suitably in spaced relation with reference to the casing 10. The casing 10 is provided with a removable cover 17 and a lid 18. In the space between the pot and the casing heat insulating material 19 is placed as is also a heating element 20 for supplying heat to the pot for melting the type metal and for maintaining it at a desired temperature.

In machines where gas is the fuel employed for supplying the necessary heat, the burners are positioned in the space beneath the pot and along the goose-neck, the lower insulating material being omitted where necessary.

Operating in the cylinder 13 is a plunger 21 which is connected by a link or lever 22 to a cam actuated arm 23 whereby molten metal from the goose-neck is forced into the mold 14, after which operation the casing 10 moves away from the mold about the pivots of the brackets 11.

In general practice the pot 16 is supplied with metal in the form of cold "slugs" which are inserted through the opening shown closed by the lid 18 in Figure 1. The mechanism above described forms part of the usual linotype machine and forms, per se, no part of the present improvements.

The practice of inserting the cold slugs in the pot 16 has certain disadvantages to correct which an auxiliary pot has come into use for melting the metal prior to the discharge of the same into the main pot. These auxiliary pots, as at present constructed, likewise have certain disadvantages in that the valves frequency become clogged, they can not be attached to the main pots without substantial modification of the latter, and are relatively costly to manufacture.

By the present improvements the disadvantages mentioned, and others, have been overcome, and as shown, comprise a casing 24 adapted to be secured, as by bolts 25, to the cover 17 of the casing 10. Adjacent the base of the casing 24 is a flange 26 upon which is supported the crucible 27 having flaring side walls as shown. The bottom 28 of the crucible is spaced from the cover 17 sufficiently to accommodate a heating element which may be a gas burner, but is shown in the present modification as an electric element 28', controlled preferably by a switch (not shown) independent of the controlling means for the heating element 20.

The bottom 28 of the crucible is provided with a passage 29 of frusto-conical shape, as shown in Fig. 1, the opening communicating with an inverted somewhat similarly shaped passage 30 in the pipe or tube 31 which is threadedly connected to the bottom 28, as illustrated. The registering passages 29 and 30 form a chamber 32 which is adapted to hold a predetermined quantity of molten metal which is discharged through the tube 31 into the pot 16 when the chamber is opened by the unseating of the valve member 33 which has a ground fit with its seat 31$^a$. The valve seat is formed on the inwardly projecting flange or rib 31$^b$ in the upper portion of the tube. The amount of metal discharged upon the opening of the valve is not limited to that contained in the chamber 32, as the latter is always open at its top to provide for the free flow of metal while the valve is unseated, but by discharging the metal in a mass, as distinguished from a thin stream, as where a needle valve is employed, oxidation of the metal is substantially reduced.

As shown in Fig. 1 the bottom of the crucible 27 is provided with a lip 34 surrounding the discharge opening 29 whereby dross and other impurities of the metal are prevented from entering the chamber 32. This construction of the bottom also assures a quantity of metal always remaining in the crucible and preventing the same from burning out, as will be clear.

A valve rod or stem 35 passes through an opening in the flange 36 and is provided with an adjusting nut 37 and lock nut 38 to control the downward movement of the valve. The lower end of the rod 35 carries a float 40 threaded thereon, and held in adjusted relation by a lock nut 41. As the metal 13 of the pot 16 is consumed in use, the float 40 will unseat the valve and permit the discharge of a quantity of metal from the crucible 27 to maintain the level of the metal in the pot within predetermined limits. The metal in passing from the crucible to the pot passes through the tube 31 which inclosure lessens the oxidation of the metal. The valve mechanism, as shown, is positioned close to the heating element 28' which arrangement prevents the accumulation of metal thereon which might interfere with the proper functioning of the valve.

A side wall of the crucible is provided with a vertical baffle 42 adjacent the valve passage 29 to prevent entrance into the same of any incompletely melted portion of metal. The baffle, as shown in Fig. 3, is disposed between the region of the valve and the right hand side of the crucible into which the cold metal is inserted, an opening for this purpose being provided and being normally closed by the lid 43. The lid may be provided with a fiber or other suitable handle 44 for raising and lowering the same.

Adjacent the baffle 42 the side wall of the crucible is provided with a re-entrant curved portion 45 which forms a vertical passage 46 between the side wall of the crucible and the casing 24 for carrying away any overflow from the crucible. An overflow channel 47 is provided in the uper edge of the side wall of the crucible, said channel communicating with the passage 46.

In cases where gas is used for heating the metal in the crucible it is desirable to provide a passage for the escape of the unburned gas and products of combustion, and with this in view a corner 48 of the crucible 27 is spaced somewhat from the corresponding corner of the casing 24, thus providing an escape flue as illustrated in Fig. 3.

As previously mentioned, the side walls of the crucible are outwardly flaring whereby the cold surface metal can readily be moved upwardly by the expansive force of the lower metal when heat is first applied, thereby lessening the danger of cracking the crucible.

For the purpose of warning the operator to replenish the supply of metal in the crucible from time to time, a signal has been provided which may comprise a swinging arm 50 having a weight 51 at its lower end and pivoted, as at 52, to the cover 53 of the casing 24. The arm extends upwardly through an opening in the cover and is arranged to strike a gong 54 which may be mounted on the cover. When the metal stands at the level shown in Figure 1, the movement of the arm 50, as the mechanism is rocked on the bracket 11 as above described, will be insufficient to effectively strike the gong, but when the level of the liquid metal is such that the weight and arm can swing freely on the pivot 52 under the impetus of the rocking mechanism, a signal will be given, as will be apparent.

Although we have shown and described certain features of the invention for the purpose of illustration, we do not wish to be restricted to the specific embodiment herein disclosed except as limitations thereto appear in the appended claims.

What we claim is:

1. Apparatus of the class described comprising in combination, a pot for molten metal, a crucible mounted above said pot, the bottom of said crucible having a raised portion provided with a discharge opening, a valve rod extending through said opening into said pot, a valve on said rod beneath said opening for controlling the flow of liquid metal therethrough, and a float on the lower end of said rod responsive to the liquid level in the pot for actuating said valve to open and closed positions for automatically regulating the flow of metal from the crucible to the pot, 2. In combination, a molten metal pot, a crucible mounted above the same, a discharge opening in the bottom of the crucible, a tube registering with said opening and terminating shortly above the normal liquid level in the pot, a valve opening and a valve seat in said tube, a valve rod passing axially through said tube and having a valve member thereon for coacting with said seat in closing the valve opening, and a float on the lower end of said rod responsive to the level of the liquid in said pot for controlling the opening and closing of the valve.

3. In combination, a molten metal pot, a crucible mounted thereabove, the bottom of the crucible having a discharge opening, a raised lip surrounding said opening, a tube secured to said crucible concentrically with said opening and extending into said pot, said tube having a circular inner flange adjacent its upper end, the lower surface of the flange comprising a valve seat, a valve rod extending from the crucible through said opening and tube into said pot, a float on the lower end of the rod responsive to the liquid level in the pot, and a valve member on said rod adapted to coact with said seat in controlling the flow of metal from the crucible to the pot in accordance with the movement of said float.

4. A crucible structure adapted to be mounted on a standard pot of a linotype machine comprising an outer casing secured to the pot, a heating element adjacent the base of said casing, said casing having inwardly directed flanges above said heating element, a crucible supported by said flanges, a metal discharge passage extending from the bottom of the crucible to said pot, a valve member for closing said passage, a rod for actuating said valve member, said rod extending from said crucible into the pot and a float on the lower end of the rod for controlling the opening and closing of the valve in accordance with the changes in the level of the liquid metal in the pot.

5. Apparatus of the class described comprising a crucible having a conical discharge opening in the bottom thereof, the mouth of said opening being above the level of the bottom to preserve an undischargable quantity of metal in the crucible, a valve for controlling the flow of metal through the opening, a rod for operating the valve, said rod extending above the normal liquid level of the crucible, a guide for said rod, adjusting means at the upper end of the rod, and a float secured to the lower end thereof below said valve, said float being adjustably secured thereto.

6. The combination with a molten metal pot adapted to rock to and fro, of a crucible structure mounted thereon and being arranged to discharge molted metal into the pot, and audible signalling mechanism on the crucible operable by the rocking movement thereof for indicating the lowering of the liquid therein below a predetermined level, said mechanism comprising a swinging operating member normally immersed in the molten metal and held against swinging movement by the metal when the same is at a predetermined level.

7. The combination with a molten metal pot adapted to rock to and fro, of a crucible structure mounted thereon and being arranged to discharge molten metal into the pot, and audible signalling mechanism on the crucible for indicating the lowering of the liquid therein below a predetermined level, said signalling mechanism comprising an oscillatable rod, a weight on the lower end of the rod normally immersed in the molten metal and adapted to oscillate said rod upon the lowering of the metal below a predetermined level when the crucible is rocked, a gong, and a member actuated by the movement of the rod and weight for sounding the gong.

8. A crucible comprising an integral receptacle having flaring side walls, an elevated bottom portion provided with a discharge opening, and a vertical baffle adjacent said opening, one of said walls having a re-entrant curved portion forming a passage on the exterior of the crucible, and a transverse overflow channel communicating with said passage.

9. A crucible for metal casting machines, and heating means for the same, the bottom of said crucible having a raised portion provided with a discharge opening whereby a given quantity of metal is preserved in the crucible above the heating means.

10. The combination with a molten metal crucible adapted to rock to and fro, of an audible signalling device carried by said crucible, and means for operating said device comprising a member oscillatable relatively to said crucible, said member depending into said crucible and being held against relative oscillation by the molten metal when the latter is above a predetermined level.

In witness whereof we have subscribed our names.

WILBUR A. JOERNDT.
FRED M. JOERNDT.